United States Patent
Neil

(10) Patent No.: US 6,970,201 B1
(45) Date of Patent: Nov. 29, 2005

(54) METHOD AND LENS SYSTEM FOR MODIFYING THE MODULATION TRANSFER FUNCTION OF LIGHT FOR A CAMERA

(75) Inventor: Iain A. Neil, Calabasas, CA (US)

(73) Assignee: Panavision, Inc., Woodland Hills, CA (US)

( * ) Notice: Subject to any disclaimer, the term of this patent is extended or adjusted under 35 U.S.C. 154(b) by 893 days.

(21) Appl. No.: 09/663,277

(22) Filed: Sep. 15, 2000

(51) Int. Cl.[7] ............... H04N 5/225; H04N 5/232; G02B 3/00; G02B 5/20; G02B 15/14
(52) U.S. Cl. ............... 348/335; 348/342; 348/345; 359/354; 359/723
(58) Field of Search ............... 348/335, 342, 348/345; 359/641–642, 722–723, 363, 379–381, 359/599, 707, 578, 889, 885, 354, 709

(56) References Cited

U.S. PATENT DOCUMENTS

| | | | |
|---|---|---|---|
| 3,981,562 A * | 9/1976 | Anthon | 359/559 |
| 5,007,719 A | 4/1991 | Hasegawa | |
| 5,029,010 A | 7/1991 | Shiraishi | |
| 5,282,043 A * | 1/1994 | Cochard et al. | 348/219.1 |
| 5,442,438 A * | 8/1995 | Batchelder et al. | 356/301 |
| 5,568,197 A | 10/1996 | Hamano | |
| 5,646,781 A | 7/1997 | Johnson, Jr. | |
| 5,841,577 A * | 11/1998 | Wachman et al. | 359/386 |
| 5,953,082 A * | 9/1999 | Butcher | 349/13 |
| 6,040,857 A * | 3/2000 | Hirsh et al. | 348/241 |
| 6,088,059 A | 7/2000 | Mihara et al. | |
| 6,104,532 A | 8/2000 | Kato | |
| 6,157,781 A * | 12/2000 | Konno et al. | 396/71 |
| 6,218,081 B1 * | 4/2001 | Nishiwaki | 430/230 |
| 6,297,912 B1 | 10/2001 | Goto | |
| 6,690,467 B1 * | 2/2004 | Reel | 356/328 |

FOREIGN PATENT DOCUMENTS

| | | | | |
|---|---|---|---|---|
| EP | 0 618 470 A1 | 10/1994 | | |
| GB | 2 259 373 A | 3/1993 | | |
| GB | 2259373 | * 10/1993 | | H04N 5/225 |
| JP | 63287922 | 11/1988 | | |
| JP | 2000089114 | 3/2000 | | |

* cited by examiner

*Primary Examiner*—Aung Moe
*Assistant Examiner*—Kelly Jerabek
(74) *Attorney, Agent, or Firm*—Morrison & Foerster LLP

(57) ABSTRACT

A method and lens system for modifying the modulation transfer function of the light passing through the lens system to a camera or other imaging system that includes providing a spatial frequency response modifying (SFRM) filter within the lens system. The SFRM filter may be a thin film(s) or other type of modifying filter, including any conventional diffusion filters. The SFRM filter is located along the optical axis where the on-axis, zero field angle light rays are collimated in any lens system and form light beam(s) of a substantially constant cross sectional area throughout the range of focusing of a prime objective lens or throughout the ranges of zooming and focusing of an objective zoom lens for providing a consistent modulation transfer function of the light reaching the camera or other imaging system.

44 Claims, 10 Drawing Sheets

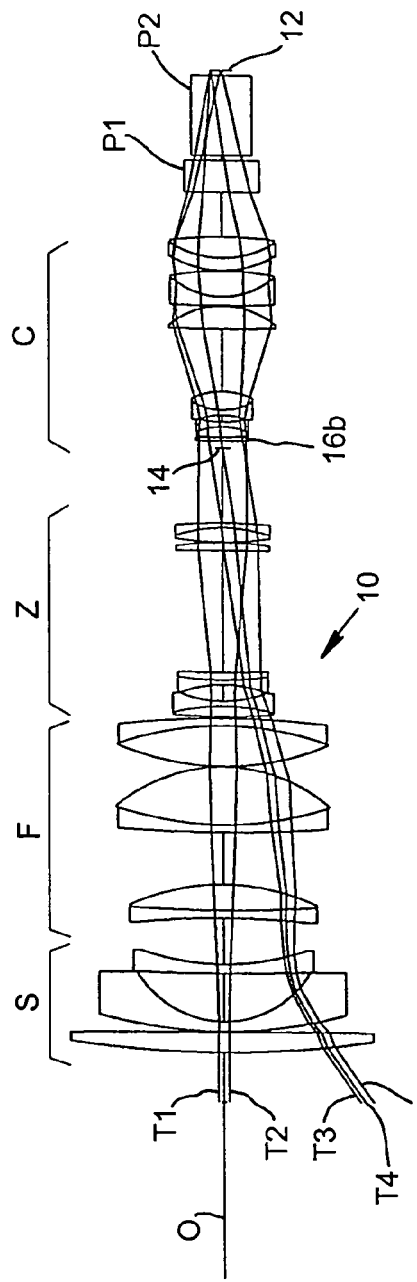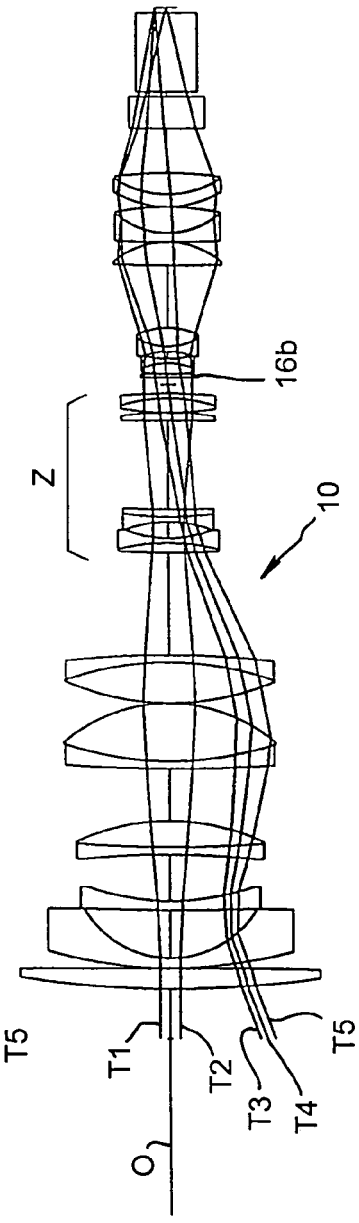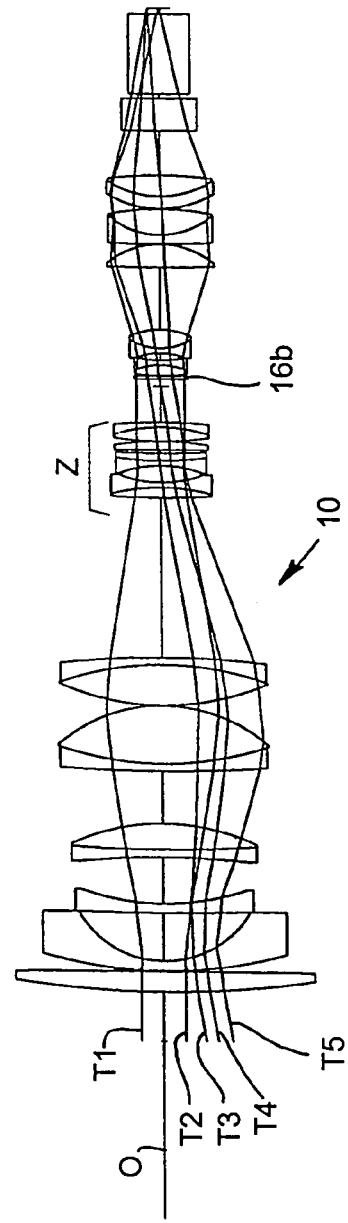
Fig. 3A
Fig. 3B
Fig. 3C

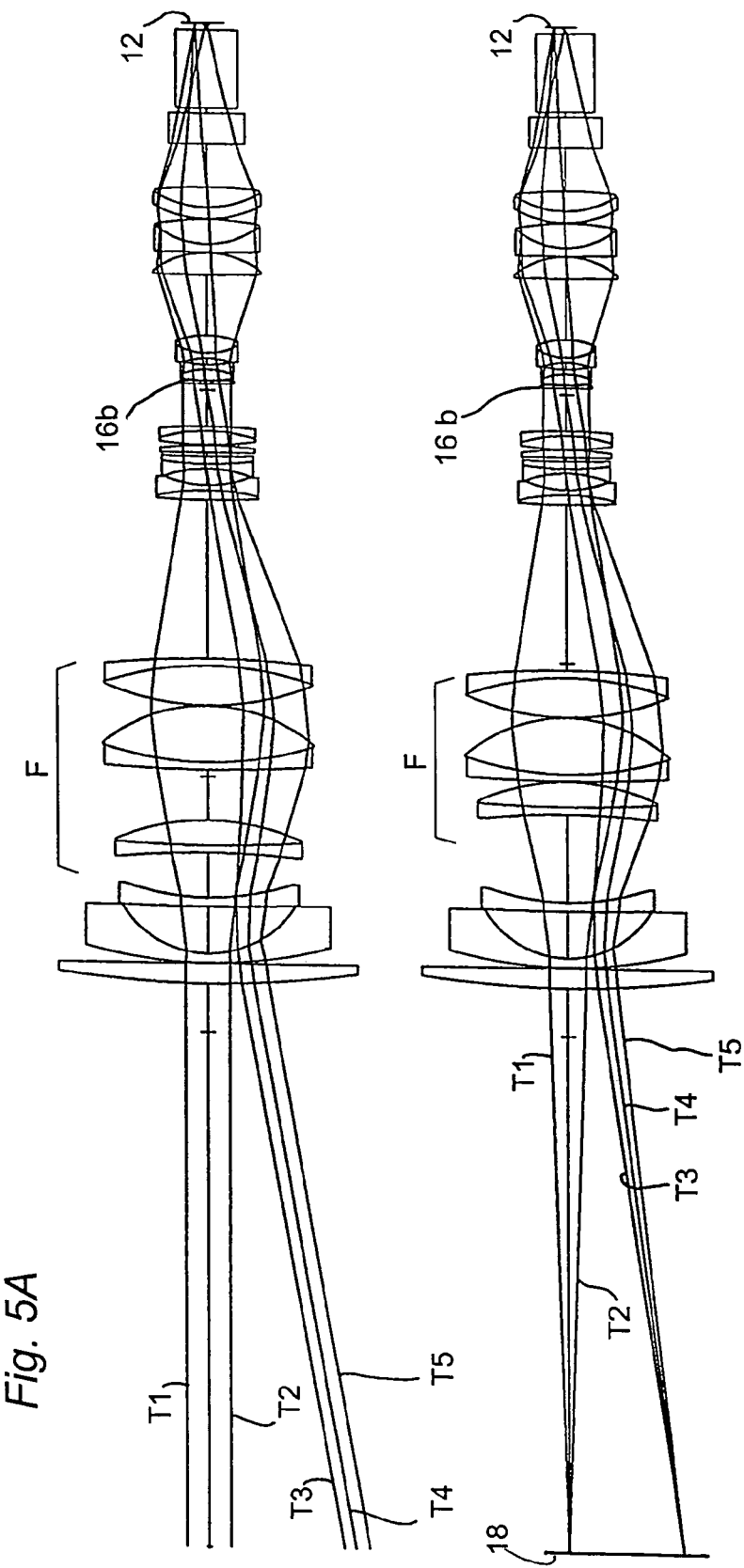

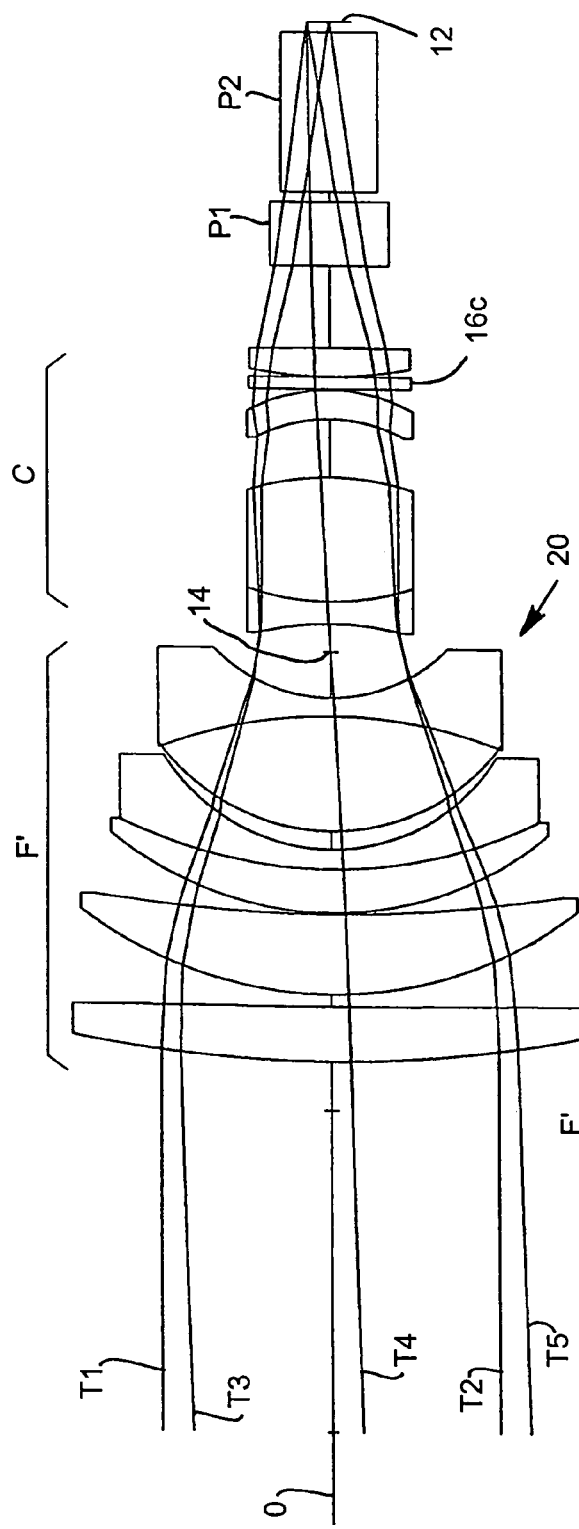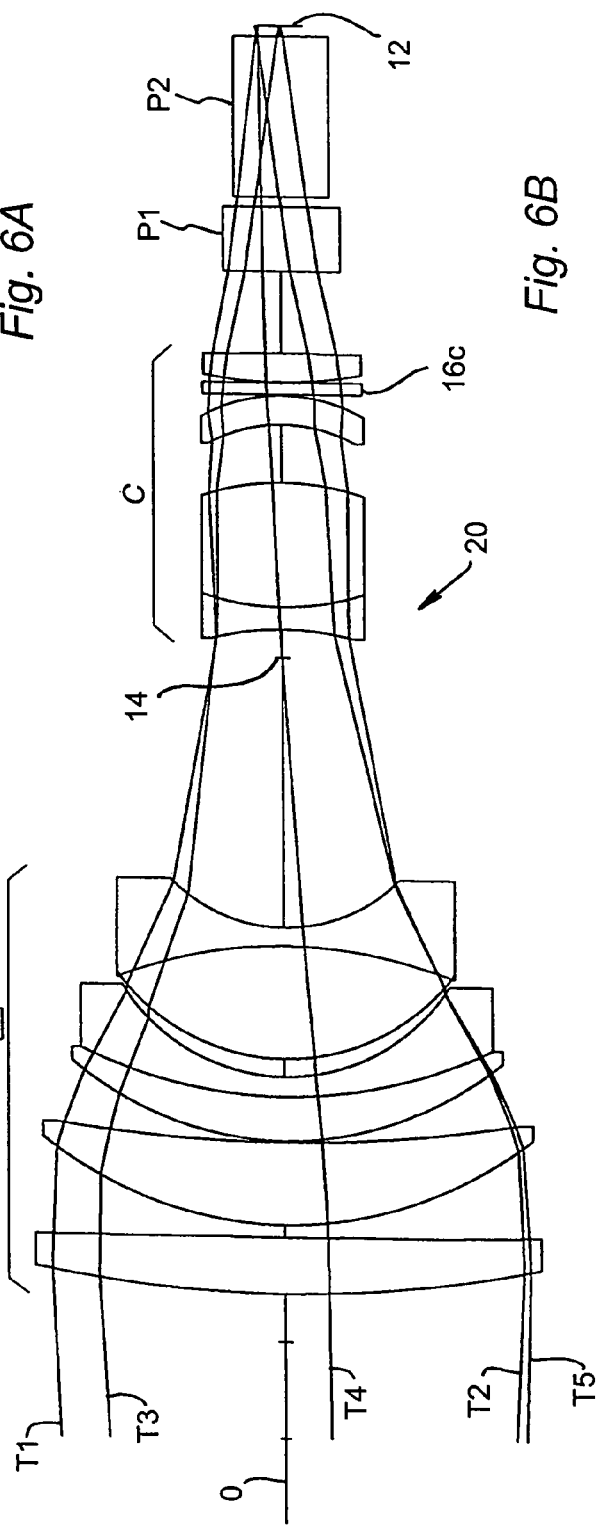
Fig. 6A
Fig. 6B

METHOD AND LENS SYSTEM FOR MODIFYING THE MODULATION TRANSFER FUNCTION OF LIGHT FOR A CAMERA

CROSS-REFERENCE TO RELATED APPLICATION

This application is related to application Ser. No. 09/447,837, filed on Nov. 23, 1999, which application is specifically incorporated herein, in its entirety, by reference.

The present invention relates to an optical lens system and method for a camera or other imaging system and, in particular, to such a lens system and method for modifying the modulation transfer function of the light supplied to the camera or imaging system in a predetermined manner for any desired purpose. The present invention is particularly advantageous when used with electronic cameras, such as modern high-definition television ("HDTV") cameras, but may also be used with other video cameras, film cameras and imaging systems.

Recent advances in Charge Coupled Device (CCD) technology have enabled electronic cameras to be built having resolution capabilities which rival conventional 35 mm motion picture film and it is likely that further developments will improve the resolution capabilities even further. Currently, HDTV video cameras are being developed using high resolution CDDs (approximately 2 million pixels per color) which will operate at the nominal frame speed of a motion picture camera (24 frames per second). These cameras are being developed, in part, as replacements for film cameras, at least for some applications. However, for the foreseeable future, film and digital cameras will need to coexist in a hybrid production environment, which will exploit the unique capabilities of both imaging mediums.

Modern motion picture film imaging utilizing an image size of approximately 18 mm by 24 mm on so-called 35 mm film is the result of an evolution of science, art and craft which has taken place over a period of 100 years. Any new imaging technology, such as HDTV, must be able to integrate within this established aesthetic paradigm. However, modern HDTV utilizes a so-called ⅔" CCD which is only 5.37 mm by 9.60 mm with a diagonal of only about 11 mm, compared to a 35 mm motion picture film frame diagonal of about 27.5 mm, and yet for cine movie theaters the two formats are projected onto the same sized large screen, whereby the HDTV image is magnified about 2.5 times more than 35 mm film. This can create more visible changes or flaws in the projected picture from an HDTV camera than a film camera using conventional filming techniques and devices.

For high quality motion picture productions, such as theater movies, it is a common practice to use so-called diffusion filters for achieving certain desired effects by modifying the spatial frequency response, i.e., the resolution of the light. A typical diffusion filter scatters the light, and the magnitude of scattering can be established by selecting a particular filter for producing the desired effect. For example, one diffusion filter may be used to create a blurred appearance for a scene and another diffusion filter may be used to eliminate the fine lines on the face of a mature actor or actress in a close-up. Both such filters serve to modify the so-called resolution, which is the spatial frequency response (commonly measured as a percent of spatial frequencies in cycles per mm, of the light supplied to the camera and a graph of such values represents the modulation transfer function). Typically, such conventional diffusion filters have been used to reduce the response in the higher cycles/mm.

Diffusion filters are commonly mounted on the front of the objective lens, although some can be mounted on the back depending on the space limitations that may exist. Conventional diffusion filters are as sophisticated as special, multi-layer thin film coatings on optical glass or as basic as a silk stocking stretched over the lens, which stocking is particularly suitable for the back of the lens because the stocking doesn't require any additional space and can be secured merely by the lens mount fitting between the lens and camera. Any diffusion filter mounted on the back of the lens requires removal of the lens for removing or changing the filter, which may be an objectionable extra step, particularly for currently popular zoom lenses that may be large, heavy and normally do not require changing for the entire shooting of a scene or scenes. On the other hand, a diffusion filter for mounting on the front of a wide-angle lens or a zoom lens may be very large and therefore may be very expensive.

Another problem with conventional diffusion filters is that the visual effect changes with changes in focus and, in the case of a zoom lens, also with changes in the focal length, i.e., zooming. Thus, for example, while a particular diffusion filter mounted on the front of an objective lens may effectively cause wrinkles on the face of a mature actor or actress to be invisible on the film or CCD at one focus distance or one zoom focal length or both, a change in the focus distance or focal length or both may objectionably cause those wrinkles to reappear or even make other desirable lines or features become invisible or less visible. Such changes are visually unacceptable in a high quality movie for projection on a screen in theaters.

These and other problems with the use of diffusion filters are accentuated with an HDTV camera because of the large magnification required from the ⅔" CCD to a theater screen, i.e., 2.5 times that of 35 mm film, as described above. In other words, the film is operating at a spatial frequency of 20 cycles/mm while the CCD is operating at 50 cycles/mm whereby the problem is amplified by 250%. Thus, for example, even the variations or imperfections in the diffusion filters that are commercially available at present may affect the image captured by the CCD. Further it is very difficult, if not impossible, to obtain the same spatial frequency response, i.e., resolution, in both a film camera and an HDTV camera for movie productions that use film and video interchangeable, which is becoming popular. For example, the 2.5 factor between 35 mm film and a ⅔" CCD does not directly translate into the units of strength of diffusion filters, i.e., a "2.5" unit diffusion filter on the film camera doesn't produce the same effect as a "1.0" unit diffusion filter on the CCD. In fact, even the variations between diffusion filters of the same type and units from the same manufacturer can produce substantially different results, particularly in the HDTV camera because of the increased sensitivity due to the increased magnification versus film.

Therefore, it is an object of the present invention to provide a method and a lens for use with a camera or other imaging system for modifying the modulation transfer function of the light passing through the lens to a predetermined relationship between the spatial frequency response and modulation of the light being supplied to the camera for causing the camera or other imaging system to record a desired and consistent spatial frequency response over the entire range of focus or focal length (zoom) adjustments.

In the preferred embodiment of the present invention, the objective lens is provided with an optical filter means on the optical axis at a location where the on-axis light rays form a light beam of a substantially constant cross-sectional area throughout focusing or zooming changes or both, which location preferably will be where the light rays are substantially collimated, for producing a predetermined modulation transfer function for the camera. Preferably, that optical filter means is of zero optical power for practical reasons, such as interchangeability, lower cost and minimizing the optical effect thereof. When the optical filter means is made of an optically transmissive material, such as glass, plastic, liquid or the like, preferably it is replaceable with a comparable optical element having substantially no spatial frequency response modifying effect or, when made of a non-optical material which passes some light, it can be removed so that there is substantially no spatial frequency response modification of the light to be supplied to the camera. A further object of this invention is to provide an objective lens with such an optical filter means that produces a predetermined modulation transfer function of light supplied to a camera that can match a specific modulation transfer function of light recorded on film, or, in other words, match the modulation versus spatial frequency of the video and film, as observed on a critical presentation medium, such as a large cinema system.

Other objects, advantages and features of the present invention will appear from the detailed description hereinafter of preferred embodiments in connection with the accompanying drawings, wherein:

FIGS. 3A, 3B and 3C are optical diagrams of the zoom lens of FIGS. 1A, 1B and 1C in the same three zoom positions but with the spatial frequency filter element for the present invention positioned at a different location along the optical axis;

FIGS. 5A and 5B are optical diagrams of the same zoom lens in the same zoom position as FIG. 3C and with the diffusion filter in the same location as FIG. 3C, but with the focus grouping of lens elements positioned at the two extremes, i.e., at infinity focus and at close focus, respectively;

FIGS. 6A and 6B are optical diagrams of a prime (fixed focal length) lens with the focus group of lens elements positioned at the two extremes, i.e., at infinity focus and at close focus, respectively;

Figure 7:
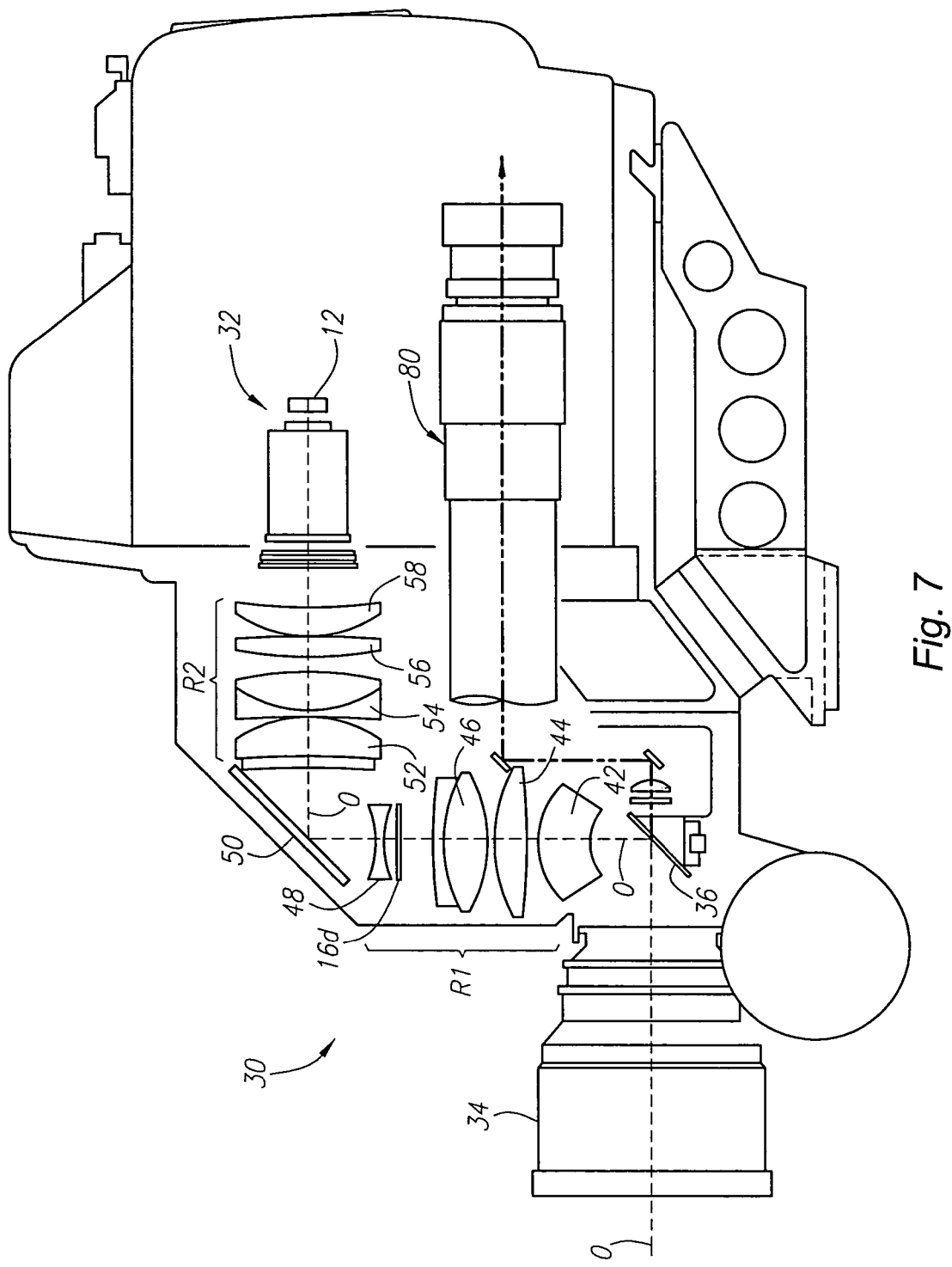
FIG. 7 is a diagrammatic elevation view of a video camera having a relay lens system and incorporating the present invention.
Figure 8A:
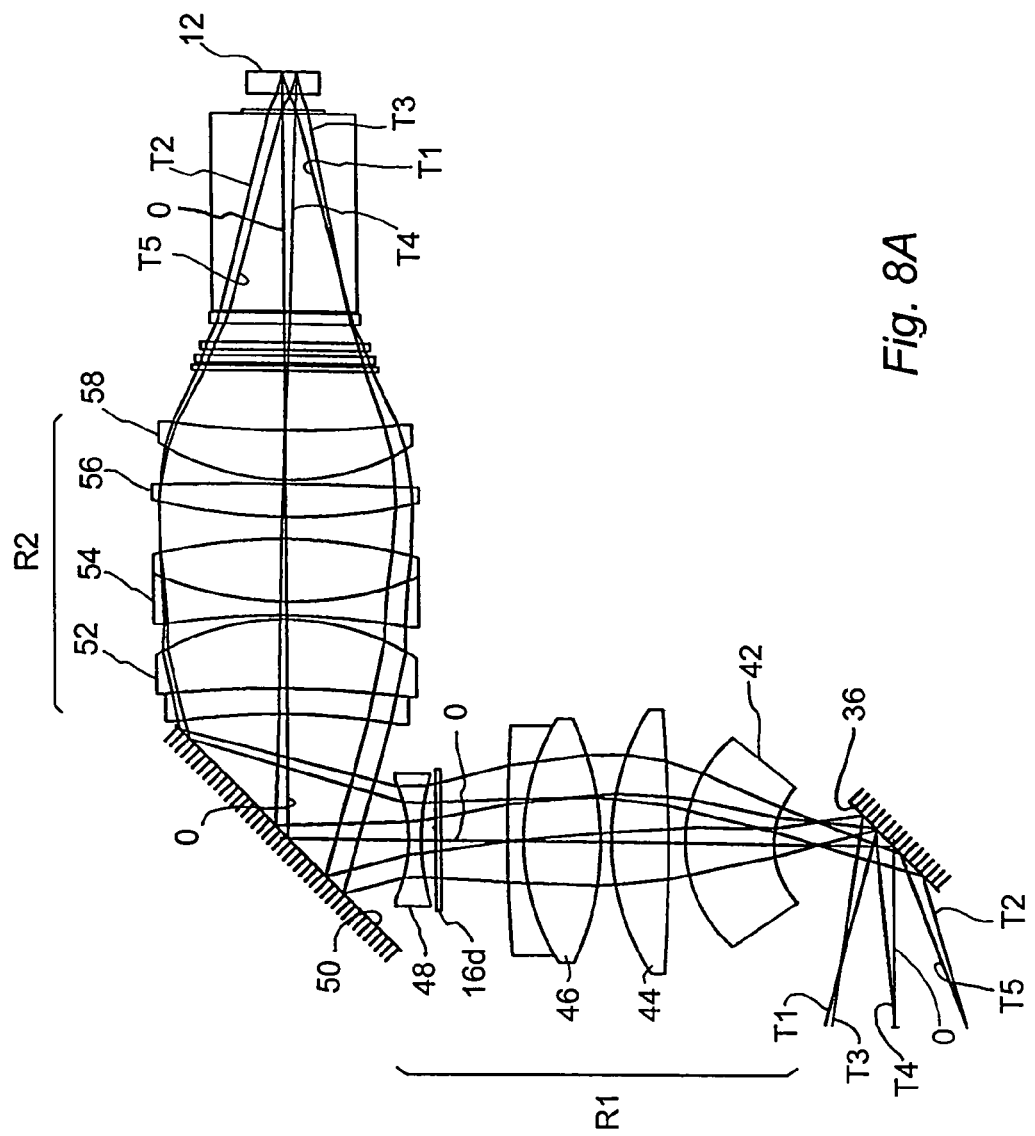
FIG. 8A is an optical diagram of the relay lens system of FIG. 7 in the physically folded arrangement of FIG. 7.
Figure 8B:
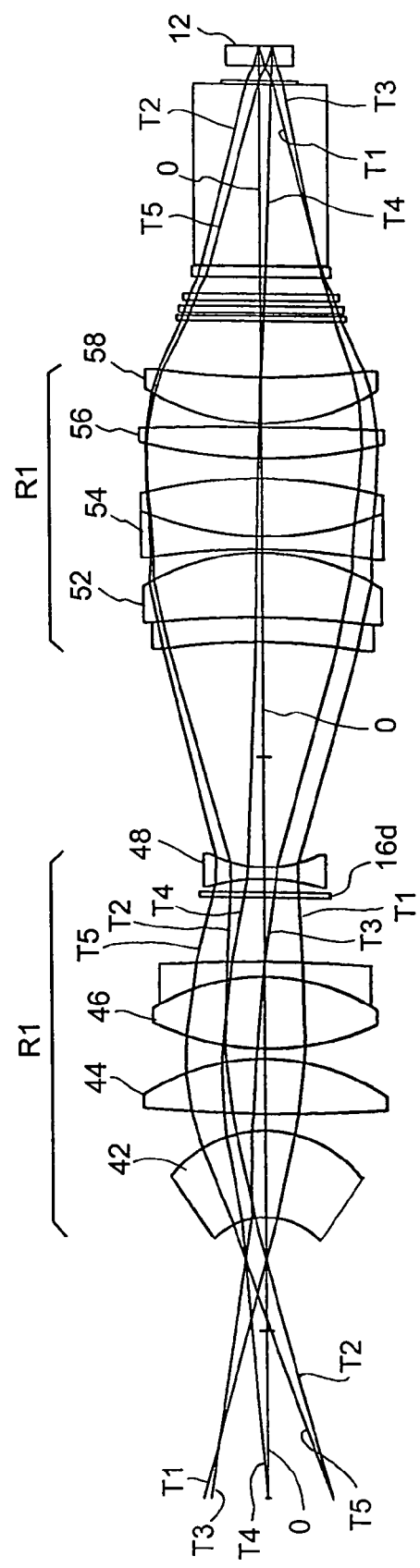
Figure 9:
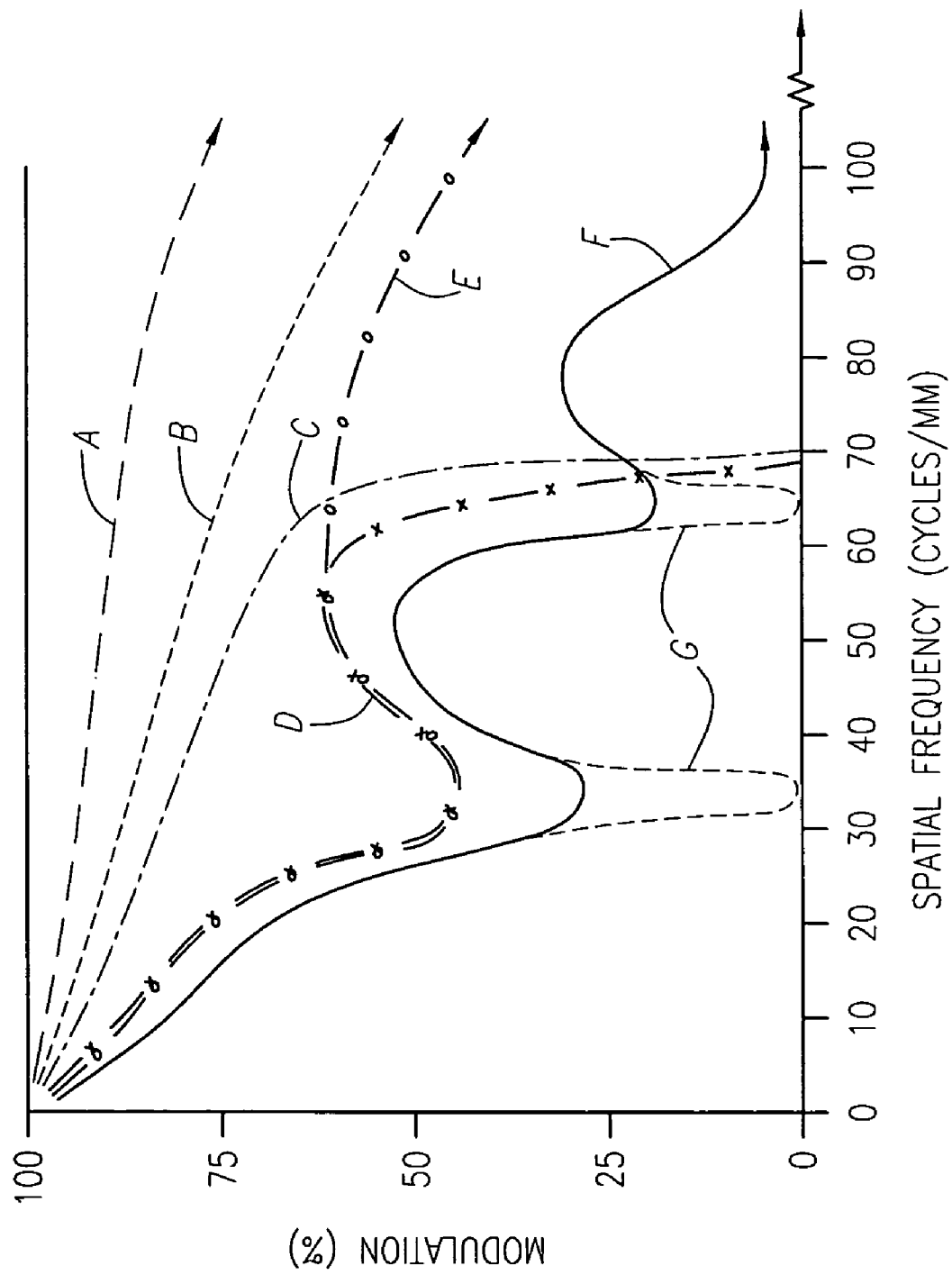

FIG. 8B is an optical diagram of the relay lens system of FIG. 7 but with the optical axis unfold into a straight line for illustration purposes; and FIG. 9 is a graph of the Modulation Transfer Function (MTF), which is the modulation (so-called "contrast") in percent versus the spatial frequency (so-called "resolution") in cycles/mm for various arrangements and filters for illustrating a variety of spatial frequency responses thereof.

The present invention will be described in connection with two different types of high performance lenses, namely, a high performance zoom lens shown in FIGS. 1A through 5B, and a high performance prime (fixed focal length) lens shown in FIGS. 6A and 6B, which lenses are of a type and quality for use on cameras in cinematography, high definition television, advanced television and the like. The zoom lens of FIGS. 1A–5B and the prime lens of FIGS. 6A, 6B are objective lenses that include the filter element and method of the present invention in an appropriate manner, but otherwise are conventional objective lenses, which demonstrates that the invention is applicable to any type of conventional objective lens. Also, the present invention will be described in connection with another type of imaging system, namely, a relay lens shown in FIGS. 7, 8A and 8B for relaying an image from an objective lens to an image detector. These embodiments also illustrate that the invention is applicable to any optical imaging system, not only objective lenses, such as a relay lens and others. Moreover, the invention may be beneficial in some unusual instances by specifically designing an objective lens or other lens system with appropriate characteristics for using the present invention. While the invention has and will be described herein with respect to lens systems for cameras, either film or electronic, it will be understood that the invention is applicable to any imaging system, all of which will be referred to as cameras.

Figure 1A:
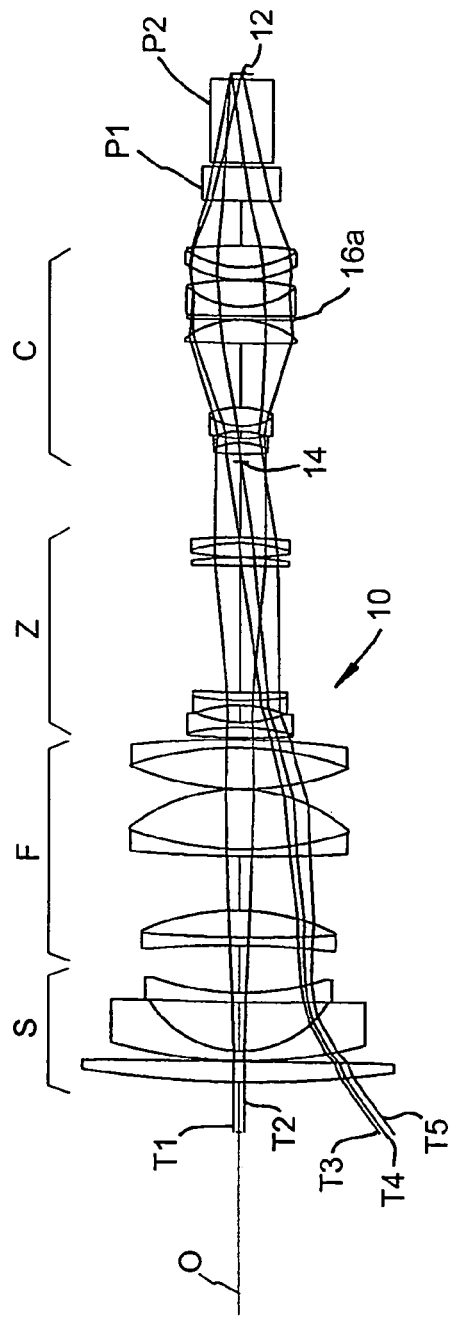
FIGS. 1A, 1B and 1C are optical diagrams of an objective lens of the zoom type having a variable focal length with the present invention incorporated in the lens, and illustrating the lens elements in three different zoom positions.
Figure 1B:
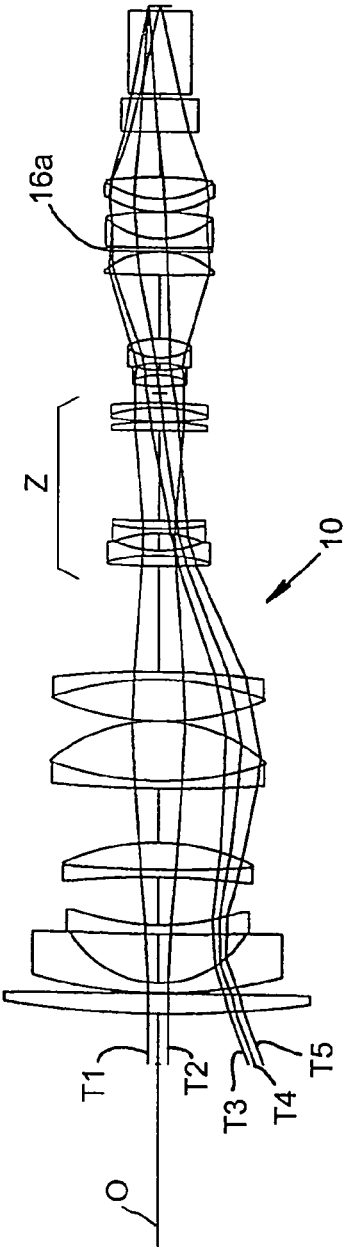
Figure 1C:
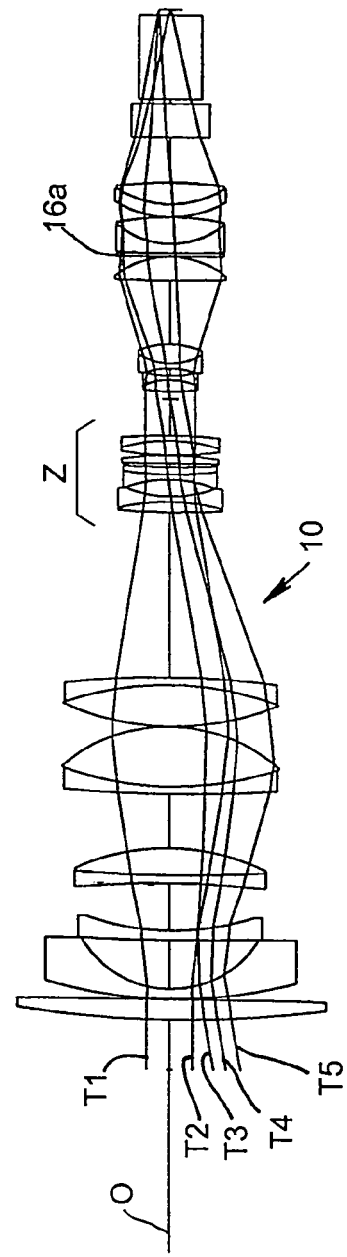

Referring now to FIGS. 1A–1C, the zoom lens 10 has the requisite groups of lens elements including a stationary objective lens group S, a moveable focus lens grouping F, a moveable zoom lens grouping Z, and a stationary collecting lens group C (sometimes called an "auxiliary" or "relay" lens), aligned on an optical axis O in that order from the front of the lens near object space to the rear of the lens at the image plane 12 (i.e., from left to right as viewed in FIGS. 1A–1C, as well as the other Figs.). The illustrated zoom lens 10 has a focal length range from about 6 mm to 27 mm, but the present invention is applicable to a zoom lens of any range of focal lengths, as well as any fixed focal length (prime) lens and other lens systems. Further, the illustrated zoom lens 10 has two lens groups forming the focus grouping F and two other lens groups forming the zoom grouping Z, each of which lens groups are movable relative to each other for accomplishing focusing at all appropriate distances and zooming for the full range of focal lengths, but more or fewer lens groups could be used to perform those functions. An optical stop or iris 14 is located immediately in front of the collecting lens group C. FIGS. 1A–1C and 2 illustrate a zoom lens optimized for an HDTV camera and therefore also illustrate prisms P1 and P2 on optical axis O, which prisms are included in the HDTV camera, for completing the optical diagram to the image plane 12, but zoom lens 10 could be modified to be optimized for a film camera.

A representative number of light ray tracings T1–T5 are shown in the optical diagrams of FIGS. 1A through 6B for illustrating the light ray paths and the angles of incident of such light ray paths at the various optical elements, the importance of which will be discussed below. Light ray tracings T1 and T2 are "on-axis" (zero field angle) tracings that, at infinity focus, are parallel to and symmetrical about optical axis O as they enter the lens 10 on the left side, and T3–T5 are typical "off-axis"(non-zero field angle) light ray tracings that are at an angle to the optical axis O as they enter the lens 10. As thus far described with respect to FIGS. 1A–1C, the zoom lens is relatively conventional and these conventional portions are the same for the zoom lens of the other FIGS. 2 through 5B.

Figure 2:
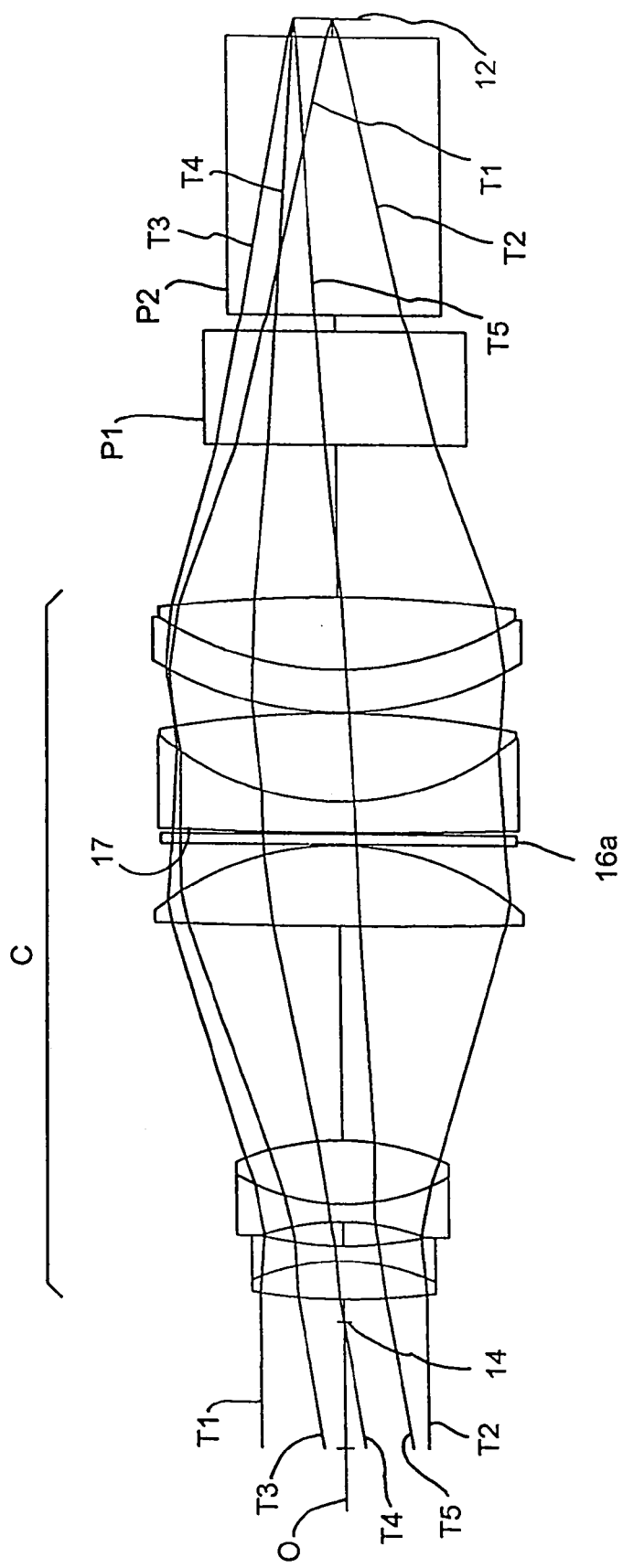
FIG. 2 is an enlarged view of a portion of the optical diagram of FIG. 1C.

Referring also to FIG. 2, which is an enlargement of the portion of FIG. 1C illustrating the elements between the iris 14 and the image plane 12, an optical element comprising the spatial frequency response modifying filter 16a (hereinafter referred to as the "SFRM filter") portion of the present invention is positioned on the optical axis O among the lens elements forming the collecting lens group C. Preferably, the SFRM filter 16a is removable and replaceable from externally of the lens housing (not shown) that supports the lens elements illustrated in the optical diagrams of FIGS. 1 and 2, whereby the filtering characteristics of the SFRM filter 16a may be varied or eliminated to meet the desired results. If the SFRM filter 16a is removable and replaceable, then a clear substrate of the same material and thickness may be substituted when no modification of the light rays is desired, such as when the camera is being used for conventional purposes. The SFRM filter 16a may be comprised of any substantially transparent material and be provided with any means that serves or may serve to modify the Modulation Transfer Function (MTF) of the light passing therethrough, such as, but not limited to, a conventional glass diffusion filter, and various other specific examples of suitable SFRM filters that will be described below.

Referring again to FIGS. 1A–1C and 2, the location of the SFRM filter 16a in a lens is specifically selected or designed into the lens to be positioned along the optical axis O at a point where the on-axis light rays that will form the image on image plane 12 comprise a light beam of a cross sectional area that remains substantially constant during all of the operating adjustments of the lens, including zooming and focusing over the full range of those adjustments for that lens or optical system. By selecting a location along the optical axis of the lens where the on-axis light rays form a light beam cross sectional area or size that remains substantially constant, the modulation transfer function by the SFRM filter 16a will remain substantially constant throughout the zooming and focusing adjustments of the lens because the density, concentration, effectiveness and the like of the means, elements, coatings, thin films or the like that cause the spatial frequency response modification that are located in the usable beam of light forming the final image remain substantially identical and therefore produce a substantially constant modulation transfer function. Such location normally is also where the light rays are substantially collimated, i.e., substantially parallel, which is preferred but not absolutely required. Also, the location must not interfere with the other optical elements or functions of the lens, such as focus and zoom adjustment movements. It should be noted that the off-axis light rays are subject to vignetting, as is well known to those skilled in the art, and therefore, and while the cross sectional area of the light beams formed by the unvignetted off-axis light rays will remain substantially constant, the cross sectional area of the light beams formed by the vignetted light rays will change, but this change does not significantly affect the desirable results of the present invention.

As illustrated in FIGS. 1A–1C and 2, the SFRM filter 16a is located within a space among the optical elements of the collecting lens group C where the light ray tracings T1–T2 are symmetrical about and nearly parallel to the optical axis O as those tracings pass through the SFRM filter 16a. Although the substantially constant cross sectional area at SFRM filter 16a of the light beams forming the image at image plane 12 is more important to the present invention for maintaining a substantially constant modulation transfer function, some types of means for creating spatial frequency response modification may perform more effectively when the angle of incident of light on the SFRM filter 16a is as close to perpendicular as possible, such as at this location. Thus, since SFRM filter 16a preferably is flat and perpendicular to the optical axis O, preferably the light ray tracings across the entire effective surface of the optical element 16a are nearly parallel to the optical axis O, as shown by tracings T1 and T2. In the zoom lens 10 of FIGS. 1A–5B, the angle between the flat surface(s) of optical element 16a and the on-axis light rays is not exactly 90°, except on the optical axis O, and is not the same across the entire surface of optical element 16a, but rather the angle varies slightly. Further, the location of SFRM filter 16a is such that the focusing adjustments and zooming movements of the lens 10 do not significantly change the ray incidence angles or the cross sectional area of the on-axis light beams at element 16a.

By comparing FIGS. 1A, 1B and 1C, which illustrate the minimum, medium and maximum focal length positions, respectively, of the zoom lens 10, it may be observed that the two light beams represented by the ray tracings T1–T5 remain substantially the same size, with the on-axis tracings T1, T2 virtually the full size, at the SFRM filter 16a, whereas the light beam size (cross sectional area) changes substantially at other forward (left of iris 14) locations within the zoom lens 10, among the three positions, which changes in area would change the spatial frequency response if the SFRM filter 16a was located at such other locations.

As an alternative to providing a separate SFRM filter 16a with means for creating spatial frequency response modification, if the lens 10 is designed for a single purpose, such as always simulating a specific filming effect, a spatial frequency response modifying thin film(s) coating or the like may be provided on the surface(s) of one or more of the other optical elements in the lens 10. Preferably, such surface(s) is substantially perpendicular to the on-axis light ray tracings, such as surface 17 in FIG. 2, and even though such a surface is not optically flat, it is acceptable if such surface is located where the cross sectional area of the on-axis light beam(s) remain substantially constant and the element preferably is removable and replaceable.

Referring now to FIGS. 3A–3C and 4, the high performance zoom lens 10 illustrated in these figures is the same as the zoom lens 10 illustrated in FIGS. 1A–1C and 2 with the only difference being in the location of the SFRM filter optical element. Thus, all of the lens groups and other elements are the same in FIGS. 1A–4 (as well as in FIGS. 5A and 5B described below) and will not be specifically described with respect to each illustration of the embodiments. In this embodiment of FIGS. 3A–4, the SFRM filter optical element 16b, comparable to optical element 16a in the first embodiment, is located at the front of the collecting lens group C and immediately behind the iris 14 as another example of a desirable location. Again, optical element 16b is preferably an optically flat element provided with any means for modifying the light for producing the desired predetermined spatial frequency response of the light that reaches the camera at the image plane 12. Preferably, the optical element 16b is removable and replaceable with other filter elements for producing other predetermined modifications of the spatial frequency response or other effect on the light, including clear glass or other substrate that will not modify the light reaching the camera or change the optical characteristics of the lens. The location of optical element 16b in this second embodiment is particularly advantageous because the on-axis light rays (tracings T1 and T2) are substantially parallel to the optical axis and the off-axis light rays (tracings T3–T5) are parallel to each other. Another advantage may be that the element is smaller in diameter and therefore less costly. FIGS. 3A, 3B and 3C illustrate short, medium and long focal lengths of the zoom lens 10, as in FIGS. 1A, 1B and 1C, respectively, and a comparison of FIGS. 3A, 3B and 3C again demonstrates that the on-axis beams of light at SFRM filter 16b maintain a substantially constant cross sectional area, whereby the spatial frequency response remains substantially constant. It should be noted that the SFRM filter 16b could be in the iris 14, but it would interfere with iris adjustments, because the iris of zoom lens 10 does not move, as it does in some other lenses.

Figure 4:
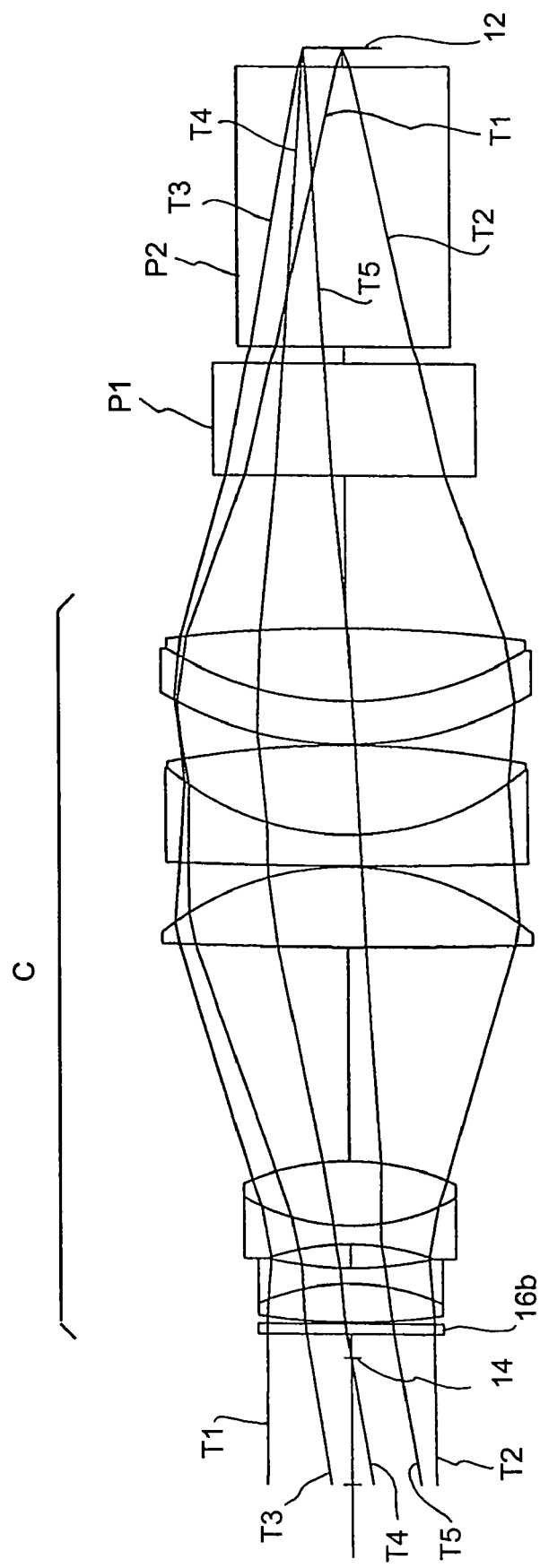
FIG. 4 is an enlarged view of a portion of the optical diagram of FIG. 3C.

Referring now to FIGS. 5A and 5B, the same zoom lens 10 is shown as in the previous figures and it is shown in the same zoom position, i.e., with a long focal length as in FIGS. 1C, 2, 3C and 4, with the SFRM filter element 16b located in the same position as in FIGS. 3C and 4. FIG. 5A shows the focus lens grouping F in a position for focusing on an object at infinity, while FIG. 5B shows the position for focusing at a minimum distance, namely, with an object at object plane 18 where the on-axis ray tracings T1, T2 meet on the optical axis O and also where the off-axis ray tracings T3–T5 meet at a point off the axis O. Again, by comparing the on-axis ray tracings T1, T2 of FIGS. 5A and 5B, it may be seen that the cross sectional area of the beams of light forming the image at plane 12 remains substantially constant at the SFRM filter 16b at the extreme range of focus adjustments, which also is true of the focus adjustments therebetween, and this is true as well for all the focal length adjustments as described above.

Also, it should be noted that with lens 10 adjusted to the close focus position shown in FIG. 5B, whereby it serves as a close focusing (sometimes called macro focusing) lens, the lens essentially functions as a relay lens to relay the object from object plane 18 at a "finite" distance, as compared to an optically "infinite" distance, to the image plane 12. This demonstrates that the present invention is applicable to a relay or collecting lens in any optical system, not solely "objective" lenses.

Referring now to FIGS. 6A and 6B, the optical elements of a prime (fixed focal length) lens 20 are diagrammatically shown for illustrating the incorporation of the present invention in a prime lens. Specifically, the illustrated prime lens 20 is a high performance lens having a fixed focal length of about 150 mm of the type that has been used for film cinematography, but is adapted in FIGS. 6A and 6B for HDTV as evidenced by the prisms P1 and P2. FIG. 6A shows the focus lens group F' of lens 20 in the position focused at infinity and FIG. 6B shows the position for focusing at the minimum object distance for the lens, whereby FIGS. 6A and 6B show the full range of focus adjustments of lens 20. An iris 14 is provided in the usual manner and location, and the lens 20 has an image plane 12 at the right hand end, as shown in the Figures. Again, a SFRM filter optical element 16c is provided on and along the optical axis O of lens 20 at an appropriate location. Specifically, at the shown location of optical element 16c within the collecting lens group C, the representative on-axis light ray tracings T1 and T2 are nearly collimated. More importantly for the present invention, the light beam at the SFRM filter 16c maintains a substantially constant cross sectional area throughout the focusing range of the lens 20, whereby the spatial frequency response remains substantially constant. As with the zoom lens 10 of the previous Figs., the SFRM filter 16c may be located elsewhere in the prime lens 20 if the cross sectional area of the light beams formed by the on-axis light rays remains substantially constant. In other prime (fixed focal length) lenses, the SFRM filter optical element 16c may be positioned at a different location that may be more beneficial, such as where the collimation of the on-axis light beam is even closer or where, for a lower cost, a smaller diameter of element may be used. As with the prior embodiments, it is preferable that the SFRM filter optical element 16c be removable and replaceable for allowing more versatile uses of the lens 20.

Referring now to FIG. 7, an electronic camera 30 is shown in elevation with some of the internal optical components diagrammatically illustrated. The camera 30 and its optical system are essentially the same as shown and described in British Patent 2,259,373, except for the inclusion here of the SFRM filter. Specifically, the camera 30 is of a type having a conventional video detector 32, such as a vacuum tube type or CCD type detector but the camera 30 is adapted to receive interchangeable lenses normally used on film cameras. Since the image created by a 35 mm objective lens is larger than the video detector 32 is capable of receiving directly, the camera 30 is provided with a light relay lens system comprised of relay lens group R1 and relay lens group R2 that relay the light from the objective lens 34 to the video detector 32 and also reduce the size of the image. The objective lens 34, relay lens group R1, relay lens group R2 and video detector 32 are aligned on a optical axis O in that order from adjacent object space (on the left in FIGS. 7, 8A and 8B) to an image plane 12 (on the right). The optical axis is folded at two locations by mirrors for creating a more compact camera. FIG. 7 also illustrates an operator's viewfinder V that is normally provided with an electronic camera but that is not relevant to the present invention.

FIGS. 8A and 8B are optical diagrams of the optical system of FIG. 7 with FIG. 8B being an unfolded diagram of the twice-folded optical diagram of FIG. 8A and therefore all three Figs. will be described together. Of course, the mirrors that fold the optical axis in FIGS. 7 and 8A are omitted from the unfolded optical diagram of FIG. 8B which otherwise is the same as FIG. 8A. The light from objective lens 34 is directed to a partial mirror 36 where part of the light passes through partial mirror 36 to the optical system of viewfinder V and the balance of the light is reflected to relay lens group R1 along optical axis O. The light passes through optical lens components 42, 44, 46 and 48 of relay lens group R1 and then reflects off full mirror 50 along optical axis O to relay lens group R2. The light passes through optical lens components 52, 54, 56 and 58 of relay lens group R2 to the video detector 32 where the image is formed at image plane 12. In accordance with the present invention, a SFRM filter 16d is removably mounted in camera 30 adjacent the lens component 48 within the relay lens group R1. This location for the SFRM filter 16d is preferred because the on-axis light rays are nearly collimated, as with the above described embodiments, and the SFRM filter 16d is of a minimum size for reducing the cost. There are other locations within the relay lens groups R1 and R2 where the SFRM filter 16d could be mounted that would produce a satisfactory filtering performance but SFRM filter 16d would be much larger, as may be seen by comparing the size of optical component 48 with the size of the other optical components 42, 44, 46, 52, 54, 56 and 58 of relay lens groups R1 and R2. Referring more particularly to the light ray tracings of FIGS. 8A and 8B, the on-axis (zero field angle) tracings T1, T2 are symmetrical about and substantially parallel to the optical axis at the SFRM filter 16d and the off-axis (non-zero field angle) tracings T3–T5 are substantially parallel to each other but at angles to the surface of SFRM filter 16d. These light ray tracings T1–T5 and all other significant light ray tracings that may be developed for this light relay lens system remain the same through all focusing adjustments of objective lens 34 as well as all focal length adjustments if objective lens 34 is a zoom lens. Thus, the spatial frequency response created by SFRM filter 16d remains constant and can be selected in the same manner as the previously described arrangements of SFRM filters 16a, 16b and 16c.

The SFRM filter optical elements 16a, 16b, 16c and 16d (collectively 16) shown in the Figures described above may be of any presently conventional type or comprised of any other means that modify the spatial frequency response, even though that means may not have been used previously for that purpose for some reason, but would be usable for the present invention because of, for example, the location in the lens. In addition to previously conventional diffusion filters that have particles, dots, dimples, scratches, lenslets or the like on the surface(s) of or within a glass plate element or sandwiched between at least two glass plates forming a glass plate element (or even a stretched silk stocking) for diffusing or scattering the light to modify the spatial frequency, the SFRM filter 16 used in this invention may be comprised of a thin film or films on a glass plate(s), a so-called phase-only filter, an interference filter that affects the light spatial frequency response, a holographic element, a controllable and variable, in situ, optical element that can vary the light scattering, direction, phase or the like. Such a controllable optical element may be of any type or construction, such as but not limited to, electro-optical devices controllable by electric current or voltage, acousto-optical devices producing electronically controllable sound waves, opto-mechanical devices controllable by movement or physical change, magneto-optical devices controllable by magnetic fields, combinations of two or more such devices or other devices, or the like that can apply an external operating force for causing variations in the spatial frequency response. Further, more than one SFRM filter 16 may be provided at different locations along the optical axis O, such as but not limited to the positions shown for SFRM filters 16a and 16b, and such multiple SFRM filters 16 may be of the various different types described above. Still further, the spatial frequency response modifying means may be provided in only a predetermined portion or portions of the cross sectional area of element 16 for causing modification(s) in only a portion or portions of the image at image plane 12. Still further, if desired, the SFRM filter 16 also may include other thin films or the like for causing a desired effect on the colorimetry of the lens system. The consistency of the spatial frequency response produced, i.e., the modulation transfer function, by the present invention allows the use of this wide variety of spatial frequency response modifying means, including perhaps the creation of otherwise unattainable visual effects.

Referring now to FIG. 9, a graph of the modulation transfer function (MTF), in general, of various arrangements of a typical lens is shown as a plot of modulation (so-called "contrast") in percent (%) versus the spatial frequency in cycles/mm at the image plane 12. This graph is shown for the on-axis, zero field angle characteristics but, of course, other graphs can be produced for any position on the image plane 12. The long dash line "A" represents a diffraction limit and the short dash line "B" represents the spatial frequency response of a lens without any diffusion or SFRM filter. The dot-dash line "C" represents the spatial frequency response of a typical conventional diffusion filter optical element 16, whereby certain spatial frequencies, usually the higher frequencies above 70 cycles/mm, are eliminated which is commonly known as a high frequency cut-off filter and, for example, will eliminate the fine lines in the face of an actor or actress. The X and dash line "D" represents a spatial frequency response of a thin film or other sophisticated SFRM filter which can reduce the response in a specific range, such as between about 20–50 cycles/mm as shown, while also eliminating the response above 70 cycles/mm as with the conventional diffusion filter of line C. The 0 and dash line "E" represents a spatial frequency response similar to line D but without the high frequency cut-off of the line D. The solid line "F" represents another sophisticated SFRM filter similar to lines D and E but including a reduced modulation at both 30–40 cycles/mm and 60–70 cycles/mm, with an increased modulation therebetween (40–60 cycles/mm) and no high frequency cut-off. The dashed lines "G" represent a modification of the spatial frequency response of the SFRM filter of line F by reducing the modulation at 30–40 and 60–70 to nearly zero. A further modification of lines F and G could reduce the modulation to zero over one or both of the ranges 30–40 and 6–70 or at other ranges and over larger or small ranges. It should be noted that each of the lines A–F actually converge or start at 0 (zero) spatial frequency and 100% modulation but a short portion of each line has been omitted from FIG. 7 for clarity of illustration of the converging lines. Also, the spatial frequency axis of the graph starts at zero and goes to a maximum frequency that is determined by the imaging system aperture and wavelength of light, as commonly known to those skilled in the art. Essentially, with sophisticated materials and methods, the spatial frequency response can be modified to produce any desired modulation transfer function desired. When SFRM filters 16 of the type that produce the spatial frequency responses of lines C through G, are used in the present invention, the spatial frequency response remains substantially constant over the full range of focus adjustments of a prime lens and over the full range of focus and focal length adjustments of a zoom lens, as well as in any optical system having at least one adjustable lens element.

Thus, by the present invention, light received by a lens or other imaging system may be spatial frequency response modified within the lens or other imaging system to produce a predetermined modulation transfer function of the light reaching the image plane to be received by the film, charge coupled device or other detector of a camera or other imaging system to thereby record the desired Modulation Transfer Function for any purpose and may do so instantaneously and in a constant manner throughout focusing and zooming of the lens. While specific embodiments of this invention have been shown and described, it will readily appear to those skilled in the art that the invention is applicable to and may include modifications and other arrangements without departing from the invention, whereby this invention is of the full scope of the appended claims.

What is claimed is:

1. In a zoom lens system having a variable focal length for use on a camera, an improvement comprising:
    an optical element positioned on an optical axis of the zoom lens system at a location along the optical axis having a substantially constant cross sectional area of on-axis light beams forming an image at an image plane in the camera throughout the variations in focal length;
    said optical element having means for causing a modification of the spatial frequency response of light supplied to the camera; and
    said optical element at a location along the optical axis where the off-axis light rays are substantially collimated and are at a minimum angle with respect to the axis;
    wherein said location along the optical axis is adjacent an iris of the lens system.

2. The zoom lens system of claim 1, wherein said optical element has a surface that is optically flat, said modifying means being on said surface.

3. The zoom lens system of claim 1, wherein said optical element is removable and replaceable from the lens system.

4. The zoom lens system of claim 3, further including a replacement optical element having substantially the same optical characteristics without means for causing modification of the spatial frequency response.

5. The zoom lens system of claim 1, wherein said location along the optical axis is adjacent an optical stop of the lens system.

6. The zoom lens system of claim 1, wherein said location along the optical axis is within a collecting lens group of the lens system.

7. The zoom lens system of claim 1, wherein said location along the optical axis has light rays which form the on-axis light beams that are substantially perpendicular to said surface of said optical element.

8. The zoom lens system of claim 1, wherein the lens system is an objective lens, and said location along the optical axis allows a full range of variable focal length changes of the objective lens without substantially changing said cross sectional area of the on-axis light beams at said optical element.

9. The zoom lens system of claim 1, wherein said optical element is comprised of a diffusion filter.

10. The zoom lens system of claim 9, wherein said diffusion filter optical element has a surface with at least one of dispersive particles, spaced and opaque dots, spaced dimples, lenslets, and scratches.

11. The zoom lens system of claim 1, wherein said modifying means of said optical element is comprised of a holographic element.

12. The zoom lens system of claim 1, wherein said modifying means of said optical element is comprised of at least one thin film on at least one surface of said optical element.

13. The zoom lens system of claim 1, wherein said modifying means of said optical element has properties which are variable in spatial frequency response modification as a result of variations in an external operative force applied to said optical element.

14. The zoom lens system of claim 13, wherein said external operative force is electrical.

15. The zoom lens system of claim 13, wherein said external operative force is acoustical.

16. The zoom lens system of claim 13, wherein said external operative force is mechanical.

17. The zoom lens system of claim 13, wherein said external operative force is optical.

18. The zoom lens system of claim 13, wherein said external operative force is magnetic.

19. The zoom lens system of claim 13, wherein said external operative force is a combination of at least two of electrical, acoustical, mechanical, optical and magnetic external operative forces.

20. The zoom lens system of claim 1, wherein said spatial frequency modifying means is provided only in a portion of said substantially constant cross sectional area of on-axis light beams passing through said optical element.

21. The zoom lens system of claim 1, wherein said spatial frequency modifying means is provided in at least two separate portions of said substantially constant cross sectional area of on-axis light beams passing through said optical element.

22. In a zoom lens system, an improvement comprising;
an optical spatial frequency response modifying filter positioned on an optical axis of the lens system at an intermediate location along the optical axis within the lens, said intermediate location having a substantially constant on-axis light beam cross sectional area and substantially collimated light for any modes of adjustment of the lens system; and
said intermediate location having substantially collimated off-axis light rays at a minimum angle with respect to the axis for any modes of adjustment of the lens system;
wherein said intermediate location along the optical axis is adjacent an iris of the lens system.

23. The zoom lens system of claim 22, wherein the lens system comprises an objective lens having focus adjusting means, and said intermediate location maintains the substantially constant on-axis light beam cross sectional area and the substantially collimated off-axis light rays are at a minimum angle with respect to the axis during focus adjustments.

24. The zoom lens system of claim 22, wherein the lens system comprises an objective lens having zooming means for varying the focal length, and said intermediate location maintains the substantially constant on-axis light beam cross sectional area and the substantially collimated off-axis light rays are at a minimum angle with respect to the axis during zooming of the lens system.

25. The zoom lens system of claim 22, wherein the lens system comprises a light relay lens system, and said intermediate location is within said light relay lens system.

26. The zoom lens system of claim 22, 23, 24 or 25, wherein said optical element is removable and replaceable from the lens system.

27. The zoom lens system of claim 26, further including a replacement optical element having substantially the same optical characteristics and without means for modifying the spatial frequency response.

28. The zoom lens system of claim 22, 23, 24 or 25, wherein said intermediate location along the optical axis is adjacent an optical stop of the lens system.

29. The zoom lens system of claim 22, 23, 24 or 25, wherein said location along the optical axis is within a collecting lens group of the lens system.

30. The zoom lens system of claim 22, 23, 24 or 25, wherein said intermediate location along the optical axis is where the on-axis light beam cross sectional area is substantially the smallest.

31. The zoom lens system of claim 30, wherein said location along the optical axis is where the off-axis light rays from an object point are substantially parallel to each other and are at a minimum angle with respect to the axis.

32. The zoom lens system of claim 22, 23, 24 or 25, wherein said filter is comprised of an optical glass element having at least one of dispersive particles, spaced and opaque dots, spaced dimples, lenslets, and scratches.

33. The zoom lens system of claim 22, 23, 24 or 25, wherein said filter is comprised of a semi-transparent fabric.

34. The zoom lens system of claim 22, 23, 24 or 25, wherein said filter is comprised of a holographic element.

35. The zoom lens system of claim 22, 23, 24 or 25, wherein said filter is comprised of an optical glass element having at least one thin film for modifying the spatial frequency response of light.

36. The zoom lens system of claim 22, 23, 24 or 25, wherein said filter is comprised of an optical element having properties which are variable in spatial frequency response as a result of variations in an external operative force applied to said optical element.

37. The zoom lens of claim 36, wherein said external operative force is electrical.

38. The zoom lens system of claim 36, wherein said external operative force is acoustical.

39. The zoom lens system of claim 36, wherein said external operative force is mechanical.

40. The zoom lens system of claim 36, wherein said external operative force is optical.

41. The zoom lens system of claim 36, wherein said external operative force is magnetic.

42. The zoom lens system of claim 36, wherein said external operative force is a combination of at least two of electrical, acoustical, mechanical, optical and magnetic external operative forces.

43. The zoom lens system of claim 22, 23, 24 or 25, wherein said filter is provided with spatial frequency modifying means only in a portion of the substantially constant on-axis light beam cross-sectional area of light passing through said filter.

44. The zoom lens system of claim 22, 23, 24 or 25 wherein said filter is provided with spatial frequency modifying means in at least two separate portions of the substantially constant on-axis light beam cross-sectional area of light passing through said filter.

* * * * *